US012552372B2

(12) United States Patent
Rachor

(10) Patent No.: US 12,552,372 B2
(45) Date of Patent: *Feb. 17, 2026

(54) VEHICULAR CONTROL SYSTEM WITH PASSING CONTROL FUNCTION

(71) Applicant: MAGNA ELECTRONICS INC., Auburn Hills, MI (US)

(72) Inventor: Martin Rachor, Heimbuchenthal (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/661,791

(22) Filed: May 13, 2024

(65) Prior Publication Data

US 2024/0300484 A1 Sep. 12, 2024

Related U.S. Application Data

(63) Continuation of application No. 18/361,969, filed on Jul. 31, 2023, now Pat. No. 11,981,329, which is a (Continued)

(51) Int. Cl.
*B60W 30/09* (2012.01)
*B60Q 9/00* (2006.01)
*B60W 30/16* (2020.01)
*B60W 30/18* (2012.01)
*B60W 50/14* (2020.01)

(52) U.S. Cl.
CPC ............. *B60W 30/09* (2013.01); *B60Q 9/008* (2013.01); *B60W 30/16* (2013.01); *B60W 30/18163* (2013.01); *B60W 50/14* (2013.01); *B60W 2420/40* (2013.01); *B60W 2520/10* (2013.01); *B60W 2554/80* (2020.02); *B60W 2554/801* (2020.02); *B60W 2754/30* (2020.02)

(58) Field of Classification Search
CPC ......... G01D 1/0212; G01D 2201/0213; G01C 21/32
USPC ............................................................. 701/25
See application file for complete search history.

(56) References Cited

U.S. PATENT DOCUMENTS

5,229,941 A * 7/1993 Hattori ................. G05D 1/0217
701/28
5,550,677 A 8/1996 Schofield et al.
(Continued)

*Primary Examiner* — Yazan A Soofi
(74) *Attorney, Agent, or Firm* — HONIGMAN LLP

(57) ABSTRACT

A vehicular control system includes cameras and radar sensors disposed at an equipped vehicle. As the equipped vehicle travels forward along a traffic lane of a multi-lane road, the system, responsive at least in part to processing of image data captured by a forward-viewing camera and/or radar data captured by a forward sensing radar sensor, detects a leading vehicle traveling in the traffic lane that the equipped vehicle is traveling along. The system, responsive at least in part to processing of image data captured by a left-side camera or a right-side camera, detects another vehicle traveling in another traffic lane that is adjacent to the traffic lane along which the equipped vehicle is traveling. With the equipped vehicle operating in accordance with SAE Level 3, the system controls maneuvering of the equipped vehicle into the other traffic lane ahead of the other vehicle to pass the leading vehicle.

62 Claims, 3 Drawing Sheets

Related U.S. Application Data continuation of application No. 18/046,983, filed on Oct. 17, 2022, now Pat. No. 11,713,038, which is a continuation of application No. 17/247,688, filed on Dec. 21, 2020, now Pat. No. 11,472,403, which is a continuation of application No. 16/014,562, filed on Jun. 21, 2018, now Pat. No. 10,870,426.

(60) Provisional application No. 62/523,407, filed on Jun. 22, 2017.

(56) References Cited

U.S. PATENT DOCUMENTS

| | | |
|---|---|---|
| 5,670,935 A | 9/1997 | Schofield et al. |
| 5,949,331 A | 9/1999 | Schofield et al. |
| 6,577,334 B1 * | 6/2003 | Kawai ............... B60G 17/0165 348/148 |
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,038,577 B2 | 5/2006 | Pawlicki et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 7,720,580 B2 | 5/2010 | Higgins-Luthman |
| 7,855,755 B2 | 12/2010 | Weller et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,327,693 B2 | 5/2016 | Wolf |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 10,870,426 B2 * | 12/2020 | Rachor ............ B60W 30/18163 |
| 11,472,403 B2 | 10/2022 | Rachor |
| 11,713,038 B2 | 8/2023 | Rachor |
| 11,981,329 B2 | 5/2024 | Rachor |
| 2002/0165054 A1 | 11/2002 | Chen |
| 2003/0023369 A1 * | 1/2003 | Takashima ....... G08G 1/096861 701/532 |
| 2010/0245066 A1 | 9/2010 | Sarioglu et al. |
| 2012/0062743 A1 | 3/2012 | Lynam et al. |
| 2012/0218412 A1 | 8/2012 | Dellantoni et al. |
| 2013/0222592 A1 | 8/2013 | Gieseke |
| 2014/0067206 A1 | 3/2014 | Pflug |
| 2014/0218529 A1 | 8/2014 | Mahmoud et al. |
| 2014/0375476 A1 | 12/2014 | Johnson et al. |
| 2015/0022664 A1 * | 1/2015 | Pflug ................... G06F 3/04883 348/148 |
| 2015/0124096 A1 | 5/2015 | Koravadi |
| 2015/0158499 A1 | 6/2015 | Koravadi |
| 2015/0198456 A1 * | 7/2015 | Ishikawa ............. G09B 29/007 701/437 |
| 2015/0251599 A1 | 9/2015 | Koravadi |
| 2015/0296135 A1 * | 10/2015 | Wacquant ............... G06F 3/013 348/207.11 |
| 2015/0344028 A1 | 12/2015 | Gieseke et al. |
| 2015/0352953 A1 | 12/2015 | Koravadi |
| 2016/0036917 A1 | 2/2016 | Koravadi et al. |
| 2016/0210853 A1 | 7/2016 | Koravadi |
| 2016/0259335 A1 | 9/2016 | Oyama ................. G05D 1/0274 |
| 2016/0334796 A1 * | 11/2016 | Inoue ................... G05D 1/0246 |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0328744 A1 * | 11/2018 | Miyake ................. G08G 1/0129 |
| 2018/0370527 A1 * | 12/2018 | Rachor .................... B60Q 9/008 |
| 2019/0384294 A1 * | 12/2019 | Shashua ................. G06F 16/29 |
| 2020/0132498 A1 * | 4/2020 | Matsumaru ........ G08G 1/096844 |
| 2020/0225044 A1 * | 7/2020 | Tohriyama .......... G01C 21/3848 |
| 2021/0248391 A1 * | 8/2021 | Kizumi ............... G01C 21/3863 |

* cited by examiner

VEHICULAR CONTROL SYSTEM WITH PASSING CONTROL FUNCTION

CROSS REFERENCE TO RELATED APPLICATIONS

The present application is a continuation of U.S. patent application Ser. No. 18/361,969, filed Jul. 31, 2023, now U.S. Pat. No. 11,981,329, which is a continuation of U.S. patent application Ser. No. 18/046,983, filed Oct. 17, 2022, now U.S. Pat. No. 11,713,038, which is a continuation of U.S. patent application Ser. No. 17/247,688, filed Dec. 21, 2020, now U.S. Pat. No. 11,472,403, which is a continuation of U.S. patent application Ser. No. 16/014,562, filed Jun. 21, 2018, now U.S. Pat. No. 10,870,426, which claims the filing benefits of U.S. provisional application Ser. No. 62/523,407, filed Jun. 22, 2017, which is hereby incorporated herein by reference in its entirety.

FIELD OF THE INVENTION

The present invention relates generally to a driving assistance system for a vehicle and, more particularly, to a driving assistance system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system for a vehicle that utilizes one or more sensors such as imaging sensors or cameras (preferably one or more CMOS cameras) and/or such as non-imaging sensors or radar sensors or lidar sensors or the like to capture data representative of objects and scenes exterior of the vehicle, and provides control of the vehicle to maneuver the vehicle to accelerate to a speed of a determined rearward approaching vehicle and/or to change lanes to avoid the path of travel of the determined rearward approaching vehicle, in order to mitigate or avoid collision with the determined rearward approaching vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
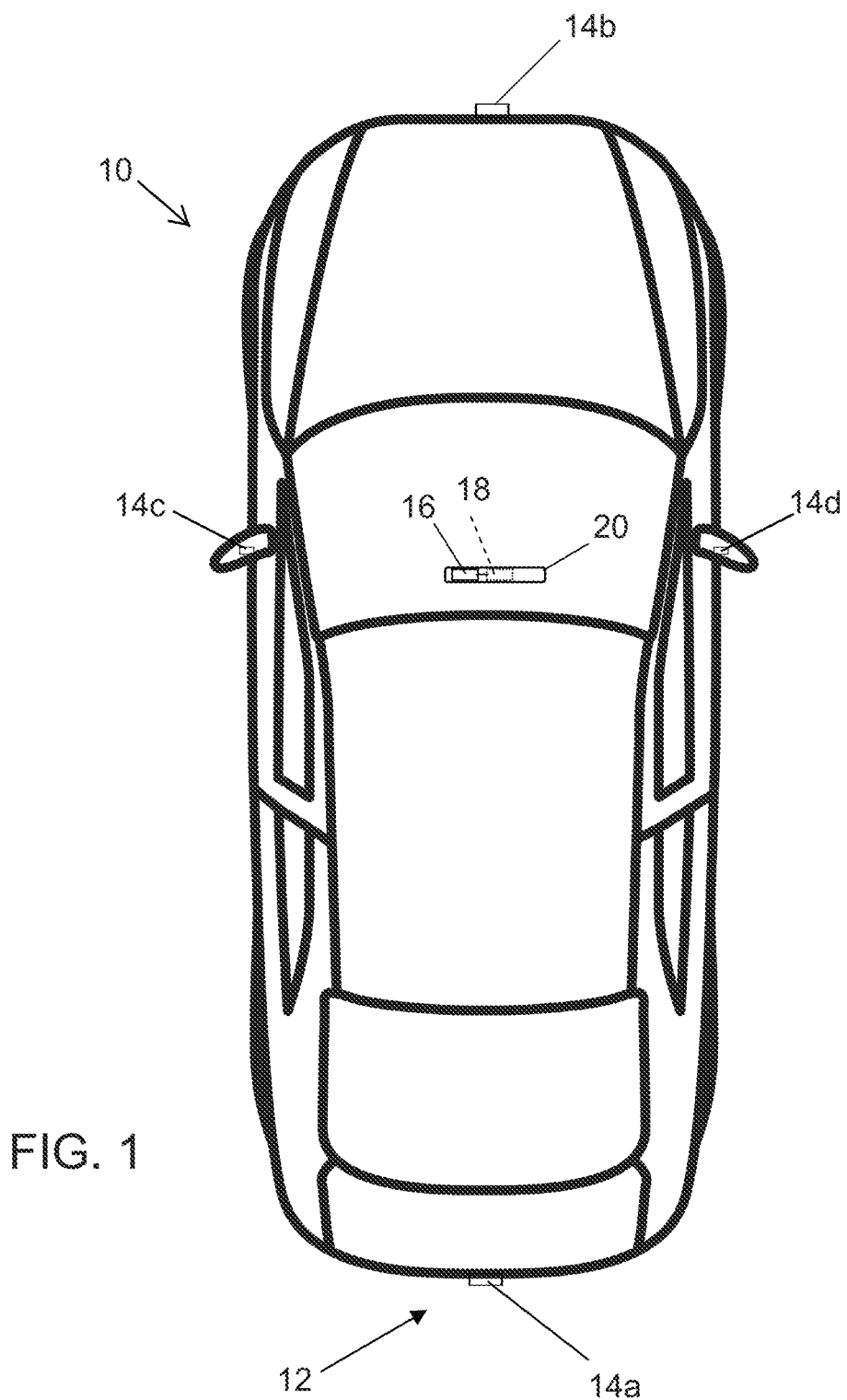
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
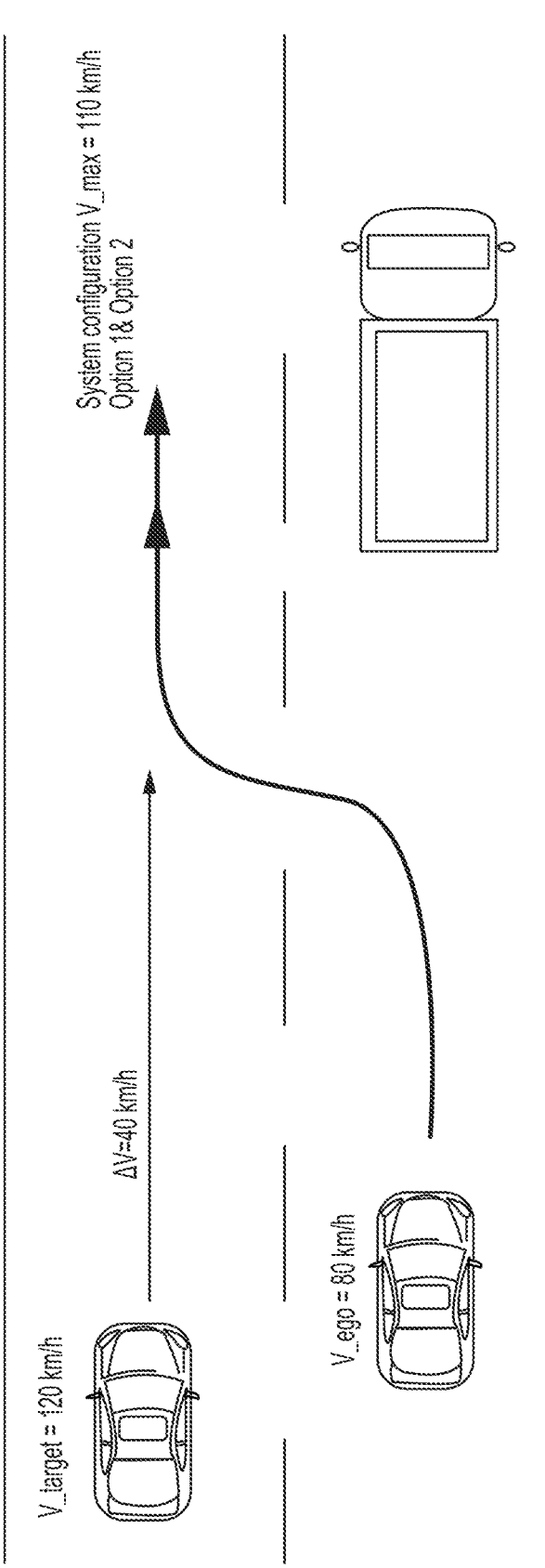
FIG. 2 is a plan view of a road on which an equipped or ego vehicle having a system in accordance with the present invention is traveling.

When a vehicle is traveling along a highway situation with several lanes, the subject vehicle (ego vehicle) may drive on a first lane or other lane and may be about to enter a lane next left to it, such as shown in FIG. 2. The ego vehicle may have sensors, such as cameras and/or non-imaging sensors, such as LADAR sensors, RADAR sensors, ultrasonic sensors and/or the like, directed rearward, sideward and forward of the vehicle to detect the surrounding (environmental) scene using sensor fusion and context interpretation, such as by utilizing aspects of the systems described in U.S. Publication No. US-2015-0344028, which is hereby incorporated herein by reference in its entirety. The sensors may sensing the environment around the vehicle including the own lane (occupied by the ego vehicle) and neighboring lanes forward, sideward and rearward for some hundred meters or so, such as, for example, around 200 m. The ego vehicle may include a control having a sensor processing algorithm that is operable (via processing of sensor data captured by the sensors of the vehicle) to detect surrounding vehicles, with their speed and direction. In case there is another vehicle approaching on the to-be-entered lane faster than the own vehicle, the approaching other vehicle may be urged to brake or decelerate. Eventually the remaining distance may be too small for avoiding a collision.

The system according the present invention may optionally display to or otherwise warn (such as via an audible alert or haptic alert or the like) the driver of the ego vehicle about the rear end collision hazard, such as by utilizing aspects of the systems described in U.S. Pat. No. 9,146,898, which is hereby incorporated herein by reference in its entirety. It may indicate acceleration/deceleration and path scenarios over an HMI to a driver of the vehicle, such as by utilizing aspects of the systems described in U.S. Pat. No. 9,327,693, which is hereby incorporated herein by reference in its entirety). This may be done when the driver is driving the vehicle. Optionally, the system may accelerate the vehicle on its own (without driver initiation) in an appropriate manner, when the free space in front allows it, which may be determined by the environmental sensor processing system. This may be done when the vehicle is driving in a driver assisting mode, such as in a cruise control with lane and lane change assistance (driver is steering, system intervenes moderately, SAE Level 2), or this may also be done when driving in a highway pilot mode or autonomous or semi-autonomous mode (without driver intervention, optionally driver supervised, SAE Level 3 and higher).

As shown in FIG. 2, when the ego vehicle is approaching a vehicle ahead and in the same lane, the ego vehicle may change lanes to pass the leading vehicle. The system determines a faster and approaching vehicle in the lane adjacent the ego vehicle and may accelerate to adapt to the speed of the determined faster rearward approaching vehicle and change lanes into the adjacent lane occupied by the rearward approaching vehicle, thus traveling ahead of the rearward approaching vehicle and at generally the same speed as the rearward vehicle. This acceleration and lane change may be triggered by the driver (such as responsive to an alert or instruction from the system) or may be done autonomously by the system of the ego vehicle. Optionally, the system may display an alert or instructions (or may audibly communicate an alert or instructions) to the driver, whereby the driver may manually accelerate and manually change lanes to the adjacent lane, again maintaining the speed of the vehicle at the determined speed of the rearward approaching vehicle in that lane. After the ego vehicle has passed the determined leading vehicle (in the initially occupied lane), the system may cause the ego vehicle to change lanes back to the initial lane (ahead of the slower leading vehicle) and slow the vehicle speed to the initial setting (or the system may provide an alert or instructions to tell the driver to decelerate and change lanes).

Figure 3:
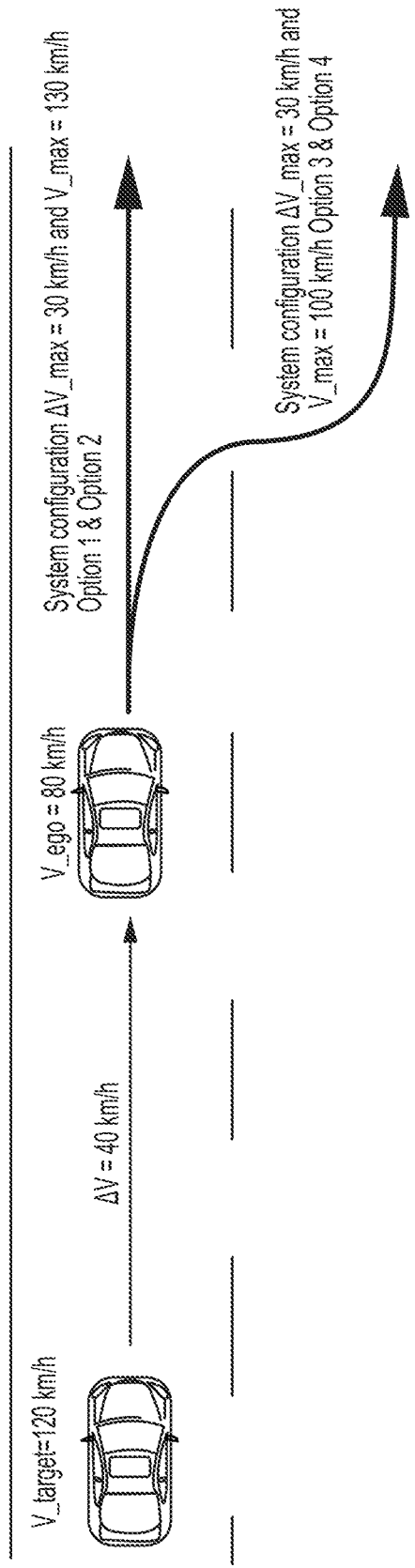
FIG. 3 is another plan view of a road on which an equipped or ego vehicle having a system in accordance with the present invention is traveling.

The system according the invention may handle other types of scenarios, such as when the ego vehicle is on the far left or a middle lane with another lane right to it (on a right hand traffic highway), such as shown in FIG. 3. At times when the ego vehicle's environmental sensing and processing system is detecting a vehicle approaching from behind with a significantly higher speed than the ego vehicle (e.g., at least 30 km/h faster) at the same lane or one lane right of the ego vehicle, the ego vehicle may either automatically change to a lane on the right to let the fast other vehicle from behind pass, or the ego vehicle may stay in the lane and may accelerate to avoid the fast other vehicle from behind having to brake massively. This may be done in a fully automated manner when the vehicle is driving in a supervised mode according SAE Level 3. The system may interact more with the driver, and may leave the final decision to the driver when the vehicle is operating in a mode according SAE Level 2. In the following it may be always referred for the automation of vehicles according SAE Level 3 with having the option to reduce the automation to an assistance mode with optional driver interactions according SAE Level 2.

As shown in FIG. 3, when the ego vehicle is traveling in a left lane (or center lane) or passing with a right lane adjacent to the occupied lane, and when the system determines a faster rearward approaching vehicle in either the same (left or passing) lane or the lane adjacent the ego vehicle to the right, the system may accelerate the ego vehicle to adapt to the speed of the determined faster rearward approaching vehicle and/or may change lanes into the adjacent lane to the right. For example, if the determined rearward approaching vehicle is in the same lane of the ego vehicle, the system may maneuver the ego vehicle into the lane to the right (if there is an opening for the ego vehicle to move or maneuver into) or may accelerate the ego vehicle to generally match the speed of the determined rearward vehicle (at least until an opening is available to move or maneuver the ego vehicle into the right lane). Optionally, the system may autonomously control the ego vehicle or may provide an alert or instruction to the driver to manually perform the appropriate or determined maneuver(s). Optionally, if a lane change is an option, the system may accelerate the ego vehicle and only change lanes if triggered by the driver, such as by the driver actuating a turn signal indicator or the like. Similarly, if the determined rearward approaching vehicle is in the right lane (the lane to the right of the lane in which the ego vehicle is traveling), the system may accelerate the ego vehicle and move the ego vehicle into that right lane, so that the rearward approaching vehicle can change to the left lane to pass the ego vehicle when the ego vehicle resumes its initial (slower) speed.

The decision whether the ego vehicle stays in the lane or changes to a lane left of it (or right of it) may be done by a decision logic, look up table, algorithm, bot or trained artificial intelligence (AI) algorithm, or optimal control (OC) algorithm, which may take the following parameters or optimization objectives into account:

distance and speed of the other vehicle from behind,
  free space ahead on the current lane of the ego vehicle,
  time and way it takes until the other vehicle from behind has closed up, passed and enough distance ahead has been established to reenter the current lane (past the other vehicle, currently behind),
  number, distance and delta speed of the vehicles behind the other vehicle closing up from behind (will there be space to reenter the current lane after the next other following vehicle from behind has passed?),
  free space right and ahead on the adjacent lane right of the ego vehicle,
  free space right and ahead on the lane next to the adjacent lane right of the ego vehicle,
  vehicles approaching from the rear significantly faster and distance to the ego vehicle at the adjacent lane right of the ego vehicle,
  vehicles approaching from the rear significantly faster and distance to the ego vehicle at the lane next to the adjacent lane right of the ego vehicle,
  distance to next exit or lane split ahead and desired path's lanes,
  speed limits on the according lanes,
  distance to speed limit beginning on the according lanes,
  estimated discomfort by lane change, accelerating and decelerating maneuvers,
  estimated time loss by lane change, accelerating and decelerating maneuvers, estimated safety win to the ego vehicle and to all surrounding other vehicles by giving way to the vehicle approaching from the rear, and/or one vehicle approaching from the rear or another vehicle left, right or ahead is an police or emergency vehicle with activated emergency signal, that has a preferred right of way.

Optionally, the system may determine alternative paths with consecutive deceleration/acceleration maneuvers for avoiding a rear end hazard. In the above referenced U.S. Pat. No. 9,146,898, the vision processing system of the rearward directed side cameras produce a determination of distance and speed of vehicles approaching from the rear in a consecutive or adjacent lane. Such systems may add to the determination of free avoidance paths which include lane changes. Also described in U.S. Pat. No. 9,146,898 is the ability of the system to determine the lane of vehicles approaching from the rear, when the road is curvy and the foot point of the subject vehicle from the rear is occluded due to the topography of the rear road. Optionally, the path planning may be done by using influence mapping as shown in the systems described in U.S. Publication No. US-2014-0067206, which is hereby incorporated herein by reference in its entirety.

The system thus may determine a rearward approaching vehicle rearward of the equipped vehicle and traveling at a speed greater than the equipped vehicle. The system or control also determines the speed of the equipped vehicle, and may determine the speed of the determined rearward approaching vehicle (such as by determining an approach rate of the rearward approaching vehicle or based on a communication from the rearward approaching vehicle, such as a vehicle-to-vehicle or v2v communication, or the like). At least in part responsive to determination of the rearward approaching vehicle, the control or system controls the equipped vehicle to accelerate the equipped vehicle to at least the determined speed of the determined rearward approaching vehicle.

The control may control the equipped vehicle to accelerate to generally match the determined speed of the determined rearward approaching vehicle and may control the equipped vehicle to maneuver the equipped vehicle into an adjacent lane responsive at least in part to (i) determination that another vehicle (or object) is ahead of the equipped vehicle in the same lane and traveling at a slower speed than the equipped vehicle (or is not moving in the same lane) and (ii) determination that the determined rearward approaching vehicle is in the adjacent lane. Thus, the equipped vehicle may be automatically maneuvered such as shown in FIG. 2.

Optionally, the control may control the equipped vehicle to accelerate to the speed of the determined rearward approaching vehicle responsive at least in part to determination that the determined rearward approaching vehicle is in the same lane as the equipped vehicle. The control may control the equipped vehicle to accelerate to the speed of the determined rearward approaching vehicle responsive at least in part to determination that there are no other vehicles present ahead of the equipped vehicle in the same lane as the equipped vehicle. The control may control the equipped vehicle to maneuver the equipped vehicle into an adjacent lane when said control determines an opening at the adjacent lane, so as to allow the rearward approaching vehicle to pass the equipped vehicle in the lane initially occupied by the equipped vehicle. For example, if the equipped vehicle is traveling in the left lane of a highway, the control may maneuver the equipped vehicle to the slower right lane to allow the rearward approaching vehicle to pass in the faster left lane (such as shown in FIG. 3).

Optionally, the control may control the equipped vehicle to accelerate to the speed of the determined rearward approaching vehicle and to maneuver into an adjacent lane responsive at least in part to determination that the determined rearward approaching vehicle is in that adjacent lane. For example, the control may determine that there is a gap ahead of the rearward approaching vehicle and may accelerate to the approaching vehicle's speed and maneuver the equipped vehicle into the gap, thus avoiding causing the approaching vehicle to have to slow down.

As another aspect of the present invention, the system's adaptive cruise control (ACC) may have a desired speed and a desired top speed, where optionally both may be set by driver input, and optionally both may be limited by the current speed limit for the current lane and optionally limited by speed limits for the specific ego vehicle (for example a general speed limit for trucks is, for example, set to 100 km/h for trucks above 7.5 t) or the ego vehicle's condition. Such a condition may be that the ego vehicle is pulling a trailer. For car-trailer trains, specific speed limitations apply depending on the trailer type (e.g., a trailer with or without its own braking system, a trailer with or without suspension and the total weight of trailer exceeding or not exceeding a certain ratio to the total weight of the pulling vehicle), such as by utilizing aspects of the systems described in U.S. Pat. No. 9,558,409, which is hereby incorporated herein by reference in its entirety.

In some countries additional speed limitations may arise depending from the driver's license type for driving a trailer train (license class), also an aspect of the systems described in U.S. Pat. No. 9,558,409. Specially trained drivers may be allowed to drive faster than untrained. The system according the invention may have access to the driver's driving license type information by user entry or provided via remote data communication.

The system includes an image processor operable to process image data captured by the camera or cameras (and/or other sensors), such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize aspects of the trailering or trailer angle detection systems or trailer hitch assist systems described in U.S. Pat. Nos. 9,085,261 and/or 6,690,268, and/or U.S. Publication Nos. US-2017-0254873; US-2017-0217372; US-2017-0050672; US-2015-0217693; US-2014-0160276; US-2014-0085472 and/or US-2015-0002670, and/or U.S. patent application Ser. No. 15/928,128, filed Mar. 22, 2018, now U.S. Pat. No. 10,552,976, Ser. No. 15/928,126, filed Mar. 22, 2018, and published on Sep. 27, 2018 as U.S. Publication No. US-2018-0276838, Ser. No. 15/910,100, filed Mar. 2, 2018, now U.S. Pat. No. 10,706,291, Ser. No. 15/885,855, filed Feb. 1, 2018, and published on Aug. 2, 2018 as U.S. Publication No. US-2018-0215382, and/or Ser. No. 15/878,512, filed Jan. 24, 2018, and published on Jul. 26, 2018 as U.S. Publication No. US-2018-0211528, and/or U.S. provisional application Ser. No. 62/533,694, filed Jul. 18, 2017, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0045812; US-2018-0015875; US-2017-0356994; US-2017-0315231; US-2017-0276788; US-2017-0254873; US-2017-0222311 and/or US-2010-0245066 and/or U.S. patent application Ser. No. 15/897,268, filed Feb. 15, 2018, now U.S. Pat. No. 10,782,388, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:
   a plurality of cameras disposed at a vehicle equipped with the vehicular control system;
   wherein the plurality of cameras comprises (i) a forward-viewing camera disposed at an in-cabin side of a windshield of the equipped vehicle and viewing exterior and at least forward through the windshield of the equipped vehicle, (ii) a left-side camera disposed at a left side of the equipped vehicle and viewing exterior and at least sideward and rearward of the equipped vehicle and (iii) a right-side camera disposed at a right side of the equipped vehicle and viewing exterior and at least sideward and rearward of the equipped vehicle;

wherein each camera of the plurality of cameras comprises an imaging array having at least one million photosensors arranged in rows and columns;

at least one radar sensor disposed at the equipped vehicle, wherein the at least one radar sensor senses forward of the equipped vehicle;

an electronic control unit (ECU);

wherein image data captured by the forward-viewing camera is transferred to the ECU and is processed at the ECU;

wherein image data captured by the left-side camera is transferred to the ECU and is processed at the ECU;

wherein image data captured by the right-side camera is transferred to the ECU and is processed at the ECU;

wherein radar data captured by the at least one radar sensor sensing forward of the equipped vehicle is transferred to the ECU and is processed at the ECU;

wherein, as the equipped vehicle travels forward along a traffic lane of a multi-lane road, the vehicular control system, responsive at least in part to processing at the ECU of at least one selected from the group consisting of (i) image data transferred to the ECU from the forward-viewing camera and (ii) radar data transferred to the ECU from the at least one radar sensor sensing forward of the equipped vehicle, detects a leading vehicle ahead of the equipped vehicle and traveling in the traffic lane that the equipped vehicle is traveling along;

wherein the vehicular control system, responsive at least in part to processing at the ECU of image data transferred to the ECU from one selected from the group consisting of (i) the left-side camera and (ii) the right-side camera, detects another vehicle traveling in another traffic lane of the multi-lane road that is adjacent to the traffic lane along which the equipped vehicle is traveling;

wherein, with the equipped vehicle operating in accordance with SAE Level 3, the vehicular control system controls maneuvering of the equipped vehicle, without driver intervention, into the other traffic lane ahead of the detected other vehicle to pass the detected leading vehicle that is traveling in the traffic lane that the equipped vehicle is traveling along; and wherein image data captured by the forward-viewing camera is processed at the ECU for at least one selected from the group consisting of (i) a traffic sign recognition system of the equipped vehicle, (ii) a headlamp control system of the equipped vehicle, (iii) a pedestrian detection system of the equipped vehicle and (iv) a lane marker detection system of the equipped vehicle.

2. The vehicular control system of claim 1, wherein, after the equipped vehicle has passed the detected leading vehicle, the vehicular control system controls maneuvering of the equipped vehicle from the other traffic lane back into the traffic lane ahead of the detected leading vehicle.

3. The vehicular control system of claim 2, wherein, after the equipped vehicle has maneuvered back into the traffic lane ahead of the detected leading vehicle, the vehicular control system decelerates the equipped vehicle.

4. The vehicular control system of claim 3, wherein, after the equipped vehicle has maneuvered back into the traffic lane ahead of the detected leading vehicle, the vehicular control system decelerates the equipped vehicle to the speed the equipped vehicle was traveling at prior to maneuvering the equipped vehicle into the other traffic lane.

5. The vehicular control system of claim 1, wherein a left-side exterior rearview mirror disposed at the left side of the equipped vehicle accommodates the left-side camera, and wherein a right-side exterior rearview mirror disposed at the right side of the equipped vehicle accommodates the right-side camera.

6. The vehicular control system of claim 1, wherein the vehicular control system controls maneuvering of the equipped vehicle into the other traffic lane ahead of the detected other vehicle for passing the detected leading vehicle based at least in part on (i) speed of the detected other vehicle relative to speed of the equipped vehicle and (ii) distance of the detected other vehicle to the equipped vehicle.

7. The vehicular control system of claim 1, wherein the vehicular control system controls maneuvering of the equipped vehicle into the other traffic lane ahead of the detected other vehicle for passing the detected leading vehicle based at least in part on determination of space along the other traffic lane ahead of the detected other vehicle that is sufficient for the equipped vehicle to execute a lane change into the other traffic lane.

8. The vehicular control system of claim 7, wherein the detected other vehicle is approaching the equipped vehicle rearward of the equipped vehicle, and wherein the vehicular control system controls maneuvering of the equipped vehicle by accelerating the equipped vehicle to at least match speed of the detected other vehicle and maneuvering the equipped vehicle into the other traffic lane ahead of the detected other vehicle to pass the detected leading vehicle.

9. The vehicular control system of claim 8, wherein the vehicular control system controls maneuvering of the equipped vehicle into the other traffic lane ahead of the detected other vehicle for passing the detected leading vehicle based at least in part on a degree of acceleration of the equipped vehicle that is required to maneuver the equipped vehicle into the other traffic lane ahead of the detected other vehicle.

10. The vehicular control system of claim 1, wherein the vehicular control system controls maneuvering of the equipped vehicle into the other traffic lane ahead of the detected other vehicle for passing the detected leading vehicle based at least in part on distance of the detected other vehicle to the equipped vehicle.

11. The vehicular control system of claim 1, wherein the vehicular control system controls maneuvering of the equipped vehicle into the other traffic lane ahead of the detected other vehicle for passing the detected leading vehicle based at least in part on speed of the detected other vehicle relative to speed of the equipped vehicle.

12. The vehicular control system of claim 1, wherein the vehicular control system controls maneuvering of the equipped vehicle into the other traffic lane ahead of the detected other vehicle for passing the detected leading vehicle based at least in part on an amount of determined space along the other traffic lane ahead of the equipped vehicle.

13. The vehicular control system of claim 1, wherein, at least in part via processing at the ECU of image data transferred to the ECU from the forward-viewing camera and radar data transferred to the ECU from the at least one radar sensor sensing forward of the equipped vehicle, the vehicular control system determines speed of the detected leading vehicle relative to speed of the equipped vehicle.

14. The vehicular control system of claim 1, wherein the vehicular control system controls maneuvering of the equipped vehicle into the other traffic lane ahead of the detected other vehicle for passing the detected leading vehicle based at least in part on a speed limit of the multi-lane road.

15. The vehicular control system of claim 1, wherein the vehicular control system controls maneuvering of the equipped vehicle into the other traffic lane ahead of the detected other vehicle for passing the detected leading vehicle based at least in part on determination that the detected other vehicle is a police or emergency vehicle.

16. The vehicular control system of claim 1, wherein the vehicular control system at least in part controls an adaptive cruise control system of the equipped vehicle.

17. The vehicular control system of claim 16, wherein image data captured by the forward-viewing camera is processed at the ECU for a traffic sign recognition system of the equipped vehicle.

18. The vehicular control system of claim 16, wherein image data captured by the forward-viewing camera is processed at the ECU for a headlamp control system of the equipped vehicle.

19. The vehicular control system of claim 16, wherein image data captured by the forward-viewing camera is processed at the ECU for a pedestrian detection system of the equipped vehicle.

20. The vehicular control system of claim 16, wherein image data captured by the forward-viewing camera is processed at the ECU for a lane marker detection system of the equipped vehicle.

21. The vehicular control system of claim 1, wherein sensor data captured by at least one lidar sensor of the equipped vehicle is transferred to and is processed at the ECU.

22. The vehicular control system of claim 1, wherein at least one other radar sensor senses exterior of the equipped vehicle, and wherein sensor data captured by the at least one other radar sensor is transferred to and is processed at the ECU.

23. The vehicular control system of claim 1, wherein sensor data captured by at least one ultrasonic sensor of the equipped vehicle is transferred to and is processed at the ECU.

24. The vehicular control system of claim 1, wherein image data transferred to the ECU from the forward-viewing camera and radar data transferred to the ECU from the at least one radar sensor sensing forward of the equipped vehicle are fused at the ECU, and wherein, as the equipped vehicle travels forward along the traffic lane of the multi-lane road, the vehicular control system detects the leading vehicle ahead of the equipped vehicle and traveling in the traffic lane that the equipped vehicle is traveling along responsive at least in part to processing at the ECU of the fused image data and radar data.

25. A vehicular control system, the vehicular control system comprising:
  a plurality of cameras disposed at a vehicle equipped with the vehicular control system;
  wherein the plurality of cameras comprises (i) a forward-viewing camera disposed at an in-cabin side of a windshield of the equipped vehicle and viewing exterior and at least forward through the windshield of the equipped vehicle, (ii) a left-side camera disposed at a left side of the equipped vehicle and viewing exterior and at least sideward and rearward of the equipped vehicle and (iii) a right-side camera disposed at a right side of the equipped vehicle and viewing exterior and at least sideward and rearward of the equipped vehicle;
  wherein each camera of the plurality of cameras comprises an imaging array having at least one million photosensors arranged in rows and columns;
  at least one radar sensor disposed at the equipped vehicle, wherein the at least one radar sensor senses forward of the equipped vehicle;
  an electronic control unit (ECU);
  wherein image data captured by the forward-viewing camera is transferred to the ECU and is processed at the ECU;
  wherein image data captured by the left-side camera is transferred to the ECU and is processed at the ECU;
  wherein image data captured by the right-side camera is transferred to the ECU and is processed at the ECU;
  wherein radar data captured by the at least one radar sensor sensing forward of the equipped vehicle is transferred to the ECU and is processed at the ECU;
  wherein, as the equipped vehicle travels forward along a right traffic lane of a multi-lane road, the vehicular control system, responsive at least in part to processing at the ECU of at least one selected from the group consisting of (i) image data transferred to the ECU from the forward-viewing camera and (ii) radar data transferred to the ECU from the at least one radar sensor sensing forward of the equipped vehicle, detects a leading vehicle ahead of the equipped vehicle and traveling in the right traffic lane that the equipped vehicle is traveling along;
  wherein the vehicular control system, responsive at least in part to processing at the ECU of image data transferred to the ECU from the left-side camera, detects another vehicle traveling in a left traffic lane of the multi-lane road that is adjacent to the right traffic lane along which the equipped vehicle is traveling;
  wherein, with the equipped vehicle operating in accordance with SAE Level 3, the vehicular control system controls maneuvering of the equipped vehicle, without driver intervention, into the left traffic lane ahead of the detected other vehicle to pass the detected leading vehicle that is traveling in the right traffic lane; and
  wherein, after the equipped vehicle has passed the detected leading vehicle, the vehicular control system controls maneuvering of the equipped vehicle from the left traffic lane back into the right traffic lane ahead of the detected leading vehicle.

26. The vehicular control system of claim 25, wherein, after the equipped vehicle has maneuvered back into the right traffic lane ahead of the detected leading vehicle, the vehicular control system decelerates the equipped vehicle.

27. The vehicular control system of claim 26, wherein, after the equipped vehicle has maneuvered back into the right traffic lane ahead of the detected leading vehicle, the vehicular control system decelerates the equipped vehicle to the speed the equipped vehicle was traveling at prior to maneuvering the equipped vehicle into the left traffic lane.

28. The vehicular control system of claim 25, wherein a left-side exterior rearview mirror disposed at the left side of the equipped vehicle accommodates the left-side camera, and wherein a right-side exterior rearview mirror disposed at the right side of the equipped vehicle accommodates the right-side camera.

29. The vehicular control system of claim 25, wherein the vehicular control system controls maneuvering of the equipped vehicle into the left traffic lane ahead of the detected other vehicle for passing the detected leading vehicle based at least in part on (i) speed of the detected other vehicle relative to speed of the equipped vehicle and (ii) distance of the detected other vehicle to the equipped vehicle.

30. The vehicular control system of claim 25, wherein the vehicular control system controls maneuvering of the equipped vehicle into the left traffic lane ahead of the detected other vehicle for passing the detected leading vehicle based at least in part on determination of space along the left traffic lane ahead of the detected other vehicle that is sufficient for the equipped vehicle to execute a lane change into the left traffic lane.

31. The vehicular control system of claim 30, wherein the detected other vehicle is approaching the equipped vehicle rearward of the equipped vehicle, and wherein the vehicular control system controls maneuvering of the equipped vehicle by accelerating the equipped vehicle to at least match speed of the detected other vehicle and maneuvering the equipped vehicle into the left traffic lane ahead of the detected other vehicle to pass the detected leading vehicle.

32. The vehicular control system of claim 31, wherein the vehicular control system controls maneuvering of the equipped vehicle into the left traffic lane ahead of the detected other vehicle for passing the detected leading vehicle based at least in part on a degree of acceleration of the equipped vehicle that is required to maneuver the equipped vehicle into the left traffic lane ahead of the detected other vehicle.

33. The vehicular control system of claim 25, wherein the vehicular control system controls maneuvering of the equipped vehicle into the left traffic lane ahead of the detected other vehicle for passing the detected leading vehicle based at least in part on distance of the detected other vehicle to the equipped vehicle.

34. The vehicular control system of claim 25, wherein the vehicular control system controls maneuvering of the equipped vehicle into the left traffic lane ahead of the detected other vehicle for passing the detected leading vehicle based at least in part on speed of the detected other vehicle relative to speed of the equipped vehicle.

35. The vehicular control system of claim 25, wherein the vehicular control system controls maneuvering of the equipped vehicle into the left traffic lane ahead of the detected other vehicle for passing the detected leading vehicle based at least in part on an amount of determined space along the left traffic lane ahead of the equipped vehicle.

36. The vehicular control system of claim 25, wherein, at least in part via processing at the ECU of image data transferred to the ECU from the forward-viewing camera and radar data transferred to the ECU from the at least one radar sensor sensing forward of the equipped vehicle, the vehicular control system determines speed of the detected leading vehicle relative to speed of the equipped vehicle.

37. The vehicular control system of claim 25, wherein the vehicular control system controls maneuvering of the equipped vehicle into the left traffic lane ahead of the detected other vehicle for passing the detected leading vehicle based at least in part on a speed limit of the multi-lane road.

38. The vehicular control system of claim 25, wherein the vehicular control system controls maneuvering of the equipped vehicle into the left traffic lane ahead of the detected other vehicle for passing the detected leading vehicle based at least in part on determination that the detected other vehicle is a police or emergency vehicle.

39. The vehicular control system of claim 25, wherein image data captured by the forward-viewing camera is processed at the ECU for at least one selected from the group consisting of (i) a traffic sign recognition system of the equipped vehicle, (ii) a headlamp control system of the equipped vehicle, (iii) a pedestrian detection system of the equipped vehicle and (iv) a lane marker detection system of the equipped vehicle.

40. The vehicular control system of claim 25, wherein sensor data captured by at least one lidar sensor of the equipped vehicle is transferred to and is processed at the ECU.

41. The vehicular control system of claim 25, wherein at least one other radar sensor senses exterior of the equipped vehicle, and wherein sensor data captured by the at least one other radar sensor is transferred to and is processed at the ECU.

42. The vehicular control system of claim 25, wherein sensor data captured by at least one ultrasonic sensor of the equipped vehicle is transferred to and is processed at the ECU.

43. The vehicular control system of claim 25, wherein image data transferred to the ECU from the forward-viewing camera and radar data transferred to the ECU from the at least one radar sensor sensing forward of the equipped vehicle are fused at the ECU, and wherein, as the equipped vehicle travels forward along the right traffic lane of the multi-lane road, the vehicular control system detects the leading vehicle ahead of the equipped vehicle and traveling in the right traffic lane responsive at least in part to processing at the ECU of the fused image data and radar data.

44. A vehicular control system, the vehicular control system comprising:
   a plurality of cameras disposed at a vehicle equipped with the vehicular control system;
   wherein the plurality of cameras comprises (i) a forward-viewing camera disposed at an in-cabin side of a windshield of the equipped vehicle and viewing exterior and at least forward through the windshield of the equipped vehicle, (ii) a left-side camera disposed at a left side of the equipped vehicle and viewing exterior and at least sideward and rearward of the equipped vehicle and (iii) a right-side camera disposed at a right side of the equipped vehicle and viewing exterior and at least sideward and rearward of the equipped vehicle;
   wherein each camera of the plurality of cameras comprises an imaging array having at least one million photosensors arranged in rows and columns;
   at least one radar sensor disposed at the equipped vehicle, wherein the at least one radar sensor senses forward of the equipped vehicle;
   an electronic control unit (ECU);
   wherein image data captured by the forward-viewing camera is transferred to the ECU and is processed at the ECU;
   wherein image data captured by the left-side camera is transferred to the ECU and is processed at the ECU;
   wherein image data captured by the right-side camera is transferred to the ECU and is processed at the ECU;
   wherein radar data captured by the at least one radar sensor sensing forward of the equipped vehicle is transferred to the ECU and is processed at the ECU;
   wherein the vehicular control system at least in part controls an adaptive cruise control system of the equipped vehicle;

wherein, as the equipped vehicle travels forward along a left traffic lane of a multi-lane road, the vehicular control system, responsive at least in part to processing at the ECU of at least one selected from the group consisting of (i) image data transferred to the ECU from the forward-viewing camera and (ii) radar data transferred to the ECU from the at least one radar sensor sensing forward of the equipped vehicle, detects a leading vehicle ahead of the equipped vehicle and traveling in the left traffic lane that the equipped vehicle is traveling along;

wherein the vehicular control system, responsive at least in part to processing at the ECU of image data transferred to the ECU from the right-side camera, detects another vehicle traveling in a right traffic lane of the multi-lane road that is adjacent to the left traffic lane along which the equipped vehicle is traveling;

wherein, with the equipped vehicle operating in accordance with SAE Level 3, the vehicular control system controls maneuvering of the equipped vehicle, without driver intervention, into the right traffic lane ahead of the detected other vehicle to pass the detected leading vehicle that is traveling in the left traffic lane; and wherein, after the equipped vehicle has passed the detected leading vehicle, the vehicular control system controls maneuvering of the equipped vehicle from the right traffic lane back into the left traffic lane ahead of the detected leading vehicle.

45. The vehicular control system of claim 44, wherein, after the equipped vehicle has maneuvered back into the left traffic lane ahead of the detected leading vehicle, the vehicular control system decelerates the equipped vehicle.

46. The vehicular control system of claim 45, wherein, after the equipped vehicle has maneuvered back into the left traffic lane ahead of the detected leading vehicle, the vehicular control system decelerates the equipped vehicle to the speed the equipped vehicle was traveling at prior to maneuvering the equipped vehicle into the right traffic lane.

47. The vehicular control system of claim 44, wherein a left-side exterior rearview mirror disposed at the left side of the equipped vehicle accommodates the left-side camera, and wherein a right-side exterior rearview mirror disposed at the right side of the equipped vehicle accommodates the right-side camera.

48. The vehicular control system of claim 44, wherein the vehicular control system controls maneuvering of the equipped vehicle into the right traffic lane ahead of the detected other vehicle for passing the detected leading vehicle based at least in part on (i) speed of the detected other vehicle relative to speed of the equipped vehicle and (ii) distance of the detected other vehicle to the equipped vehicle.

49. The vehicular control system of claim 44, wherein the vehicular control system controls maneuvering of the equipped vehicle into the right traffic lane ahead of the detected other vehicle for passing the detected leading vehicle based at least in part on determination of space along the right traffic lane ahead of the detected other vehicle that is sufficient for the equipped vehicle to execute a lane change into the right traffic lane.

50. The vehicular control system of claim 49, wherein the detected other vehicle is approaching the equipped vehicle rearward of the equipped vehicle, and wherein the vehicular control system controls maneuvering of the equipped vehicle by accelerating the equipped vehicle to at least match speed of the detected other vehicle and maneuvering the equipped vehicle into the right traffic lane ahead of the detected other vehicle to pass the detected leading vehicle.

51. The vehicular control system of claim 50, wherein the vehicular control system controls maneuvering of the equipped vehicle into the right traffic lane ahead of the detected other vehicle for passing the detected leading vehicle based at least in part on a degree of acceleration of the equipped vehicle that is required to maneuver the equipped vehicle into the right traffic lane ahead of the detected other vehicle.

52. The vehicular control system of claim 44, wherein the vehicular control system controls maneuvering of the equipped vehicle into the right traffic lane ahead of the detected other vehicle for passing the detected leading vehicle based at least in part on distance of the detected other vehicle to the equipped vehicle.

53. The vehicular control system of claim 44, wherein the vehicular control system controls maneuvering of the equipped vehicle into the right traffic lane ahead of the detected other vehicle for passing the detected leading vehicle based at least in part on speed of the detected other vehicle relative to speed of the equipped vehicle.

54. The vehicular control system of claim 44, wherein the vehicular control system controls maneuvering of the equipped vehicle into the right traffic lane ahead of the detected other vehicle for passing the detected leading vehicle based at least in part on an amount of determined space along the right traffic lane ahead of the equipped vehicle.

55. The vehicular control system of claim 44, wherein, at least in part via processing at the ECU of image data transferred to the ECU from the forward-viewing camera and radar data transferred to the ECU from the at least one radar sensor sensing forward of the equipped vehicle, the vehicular control system determines speed of the detected leading vehicle relative to speed of the equipped vehicle.

56. The vehicular control system of claim 44, wherein the vehicular control system controls maneuvering of the equipped vehicle into the right traffic lane ahead of the detected other vehicle for passing the detected leading vehicle based at least in part on a speed limit of the multi-lane road.

57. The vehicular control system of claim 44, wherein the vehicular control system controls maneuvering of the equipped vehicle into the right traffic lane ahead of the detected other vehicle for passing the detected leading vehicle based at least in part on determination that the detected other vehicle is a police or emergency vehicle.

58. The vehicular control system of claim 44, wherein image data captured by the forward-viewing camera is processed at the ECU for at least one selected from the group consisting of (i) a traffic sign recognition system of the equipped vehicle, (ii) a headlamp control system of the equipped vehicle, (iii) a pedestrian detection system of the equipped vehicle and (iv) a lane marker detection system of the equipped vehicle.

59. The vehicular control system of claim 44, wherein sensor data captured by at least one lidar sensor of the equipped vehicle is transferred to and is processed at the ECU.

60. The vehicular control system of claim 44, wherein at least one other radar sensor senses exterior of the equipped vehicle, and wherein sensor data captured by the at least one other radar sensor is transferred to and is processed at the ECU.

61. The vehicular control system of claim 44, wherein sensor data captured by at least one ultrasonic sensor of the equipped vehicle is transferred to and is processed at the ECU.

62. The vehicular control system of claim 44, wherein image data transferred to the ECU from the forward-viewing camera and radar data transferred to the ECU from the at least one radar sensor sensing forward of the equipped vehicle are fused at the ECU, and wherein, as the equipped vehicle travels forward along the left traffic lane of the multi-lane road, the vehicular control system detects the leading vehicle ahead of the equipped vehicle and traveling in the left traffic lane responsive at least in part to processing at the ECU of the fused image data and radar data.

* * * * *